United States Patent [19]
Bishop

[11] Patent Number: 5,454,703
[45] Date of Patent: Oct. 3, 1995

[54] APPARATUS FOR MOLDING EXPANDED POLYMER BEADS

[75] Inventor: Gary E. Bishop, Troy, Mich.

[73] Assignee: Saturn Corporation, Troy, Mich.

[21] Appl. No.: 269,329

[22] Filed: Jun. 30, 1994

[51] Int. Cl.⁶ .................................................. B29C 67/20
[52] U.S. Cl. ........................................ 425/4 R; 249/111
[58] Field of Search ..................... 425/4 R, 4 C, 425/817 R, 817 C; 264/51; 249/111

[56] References Cited

U.S. PATENT DOCUMENTS

| | | | |
|---|---|---|---|
| 3,139,466 | 6/1964 | Couchman | 264/51 |
| 3,170,010 | 2/1965 | Schultz et al. | 264/51 |
| 3,452,124 | 6/1969 | Knapp | 264/53 |
| 3,837,769 | 9/1974 | Erlenbach | 425/4 R |
| 3,912,430 | 10/1975 | Noel | 425/4 R |
| 4,225,109 | 9/1980 | Yotsutsuji | 249/111 |
| 4,492,663 | 1/1985 | Reinfeld et al. | 425/4 R |
| 4,685,872 | 8/1987 | Erlenbach | 425/4 R |
| 4,813,859 | 3/1989 | Bullard et al. | 425/4 R |
| 5,037,592 | 8/1991 | Erlenbach | 425/4 R |
| 5,085,814 | 2/1992 | Kamiyama et al. | 425/4 R |
| 5,100,597 | 3/1992 | Erlenbach | 264/51 |
| 5,370,515 | 12/1994 | Bazzica | 425/4 R |

OTHER PUBLICATIONS

The Erlenbach Moulding Machine Series EHV 52/42/1 and EHV 67/57/1, undated.

Primary Examiner—Richard L. Chiesa
Attorney, Agent, or Firm—Lawrence B. Plant

[57] ABSTRACT

Apparatus for molding expanded polymer beads by the steam-fusion technique including mold segments having perforate walls, steam chests confronting the mold segments, and thermal insulation located at the junction between the mold segments and the steam chests to reduce conductive heat transfer therebetween.

4 Claims, 2 Drawing Sheets

APPARATUS FOR MOLDING EXPANDED POLYMER BEADS

This invention relates to apparatus for molding foam bodies from expanded polymeric beads using the steam-fusion technique, and more particularly to such apparatus having a shortened cycle time.

BACKGROUND OF THE INVENTION

The molding of pre-expanded polymeric beads (e.g., expanded polystyrene—a.k.a. EPS) into foamed articles such as drinking cups, "lost-foam" molding patterns, Christmas decorations, etc., is a well known process wherein partially pre-expanded beads are blown into a mold, and therein subjected to steam to complete their expansion and fuse them together into a unitary mass. Expandable polystyrene is commercially available in the form of relatively small (e.g., 0.25 mm diameter, 40 lbs./ft.$^3$ density) white beads. The beads are formed of a suitable grade of polystyrene homopolymer for the intended molding purpose. Distributed throughout each polystyrene bead is an amount, usually about 5.5 to 6.5 percent by weight, of a suitable vaporizable expanding agent such as the hydrocarbon pentane. A portion of the pentane is probably dissolved in the polymer matrix of the bead, but a major portion of the pentane is distributed in microcavities throughout the polystyrene bead.

Before articles can be molded from the beads, the beads are subjected to a pre-expansion operation in which they are expanded and reduced in density by heating. Pre-expansion equipment is readily available commercially. In one pre-expansion process, a group of the beads is conveyed into a closed cavity where the beads are contacted with saturated steam at low superatmospheric pressure. The steam heat produces an expansion of the beads so that their diameter is increased, e.g., about fourfold, and some of the expanding agent, the pentane, is lost. The beads are discharged into a fluidized bed where room temperature air fluidizes, dries and cools the beads. At the conclusion of the pre-expansion step, the density of the beads is typically in the range of 1 to 1.6 lbs./ft.$^3$, and the content of the pentane at this stage is suitably about four to five percent by weight of the bead. The diameter of the bead is now about 1 mm. The expanded bead has a cellular structure and is close to the size at which it can be suitably molded into a finished article, e.g., a "lost foam" foundry pattern. In another version of the pre-expansion process, the beads are drawn into a space which is evacuated, where they are heated at about 200° F. in the vacuum to accommodate the expansion of the beads. The expansion of the beads is arrested by the addition of water to the system. The water flashes in the vacuum, cooling the beads prior to discharge from the vacuum vessel. After this stage, the expanded beads are typically screened to remove any of the raw beads that fail to undergo the expansion process or any clumps of beads that are stuck together.

Molding of the beads into a finished article follows. The mold used to shape the foamed article has perforate walls defining a mold cavity and through which the steam enters the mold cavity. The mold is sandwiched between a pair of steam chests for applying the steam to the mold. The molds typically comprise separable mold segments/inserts inserted in and clamped, or otherwise affixed, to the steam chests. The use of mold inserts permits a single steam chest to be used with a variety of different molds for making a variety of different articles.

In the "flow-through" steaming technique, steam is introduced, through one of the mold segments on one side of the mold cavity, passes through the bed of beads in the mold cavity, and exits the mold cavity through the other mold segment on the opposite side of the mold cavity. An alternative steaming technique is known as "autoclaving" which involves pressurizing both steam chests at the same time so as to soak the beads in the steam for a sufficient duration to expand and fuse the beads together. Some practitioners use a combination of both the flow-through and the autoclaving techniques to insure rapid, uniform heating and bonding of the beads.

Following steaming, the molded article is cooled by spraying water onto the backside of the mold segments and/or by the application of vacuum to the steam chests until the expansion of the beads is arrested. In the case of EPS, steaming occurs at about 240° F. Thereafter, the mold is cooled to about 140° F. before bead expansion is arrested. The precise amount of time needed for steaming and cooling will vary with the size and complexity of the particular article being molded and the uninsulated mold mass. The mold is then opened, and the molded article ejected, e.g., by means of compressed air, mechanical ejection pins or the like. The mold is then closed and the cycle repeated.

In order to increase productivity of the apparatus, it is necessary to shorten the time required to complete the aforesaid operational cycle. One impediment to shortening the cycle time is the time required to heat-up and cool-down the mold segments, steam chest, and plumbing attachments thereto. In this regard, while the beads are being steamed, the surrounding metal forming the molding apparatus heats up and must then be cooled by as much as 100° F. or more before ejection of the article from the mold can occur. Another impediment to shortening the cycle time is the time required to build-up steam pressure to flow through the beads in the mold during the steaming cycle as well as to build-up a vacuum to cool down the mold and molded article.

Heretofore, the cycle time as well as the energy requirements of the molding apparatus has been reduced by: (1) reducing the mass of the systems components, (2) making the molds and steam chests from aluminum which has a relatively low specific heat for quicker heating and cooling with relatively low energy consumption; and (3) lining the steam chest with an insulating material to reduce the heat transfer from the steam cavity to the metal (e.g., aluminum) forming the steam chest. While these techniques have improved the cycle time and reduced the required energy load, further cycle-time reductions are desirable.

Accordingly, it is an object of the present invention to further reduce the operational cycle time of an expanded polymer bead molding apparatus by reducing the amount of heat conducted between the steam chests and the mold segments attached thereto.

This and other objects and advantages of the present invention will become more readily apparent from the description thereof which follows.

BRIEF DESCRIPTION OF THE INVENTION

I have found that the overall cycle time of an expanded polymer bead molding apparatus can be shortened by substantially preventing the temperature of the mold segments from rising after they have been cooled incident to conductive thermal feedback from the steam chest. Conductive thermal feedback from the steam chest can cause the mold temperature to elevate unacceptably and accordingly delay commencement of the next cycle until the mold can cool adequately. In this regard, it is important that following ejection of the molded article, and prior to commencing the next molding cycle, that the surface of the mold be kept at a sufficiently low temperature that the polymeric beads blown into the mold cavity do not soften or otherwise become significantly preheated upon contact with the mold surface. If the mold wall is too hot and the beads soften and/or fuse upon contact therewith, a low porosity skin can form on the surface of the bed of beads which inhibits steam flow into the center of the bed. To prevent the mold from undesirably reheating after cooling and before filling with beads, the invention comprehends apparatus for the molding and steam-fusion of expanded polymeric particles (e.g., EPS) which includes provisions to substantially reduce conductive thermal feedback into the mold segments from the metal forming steam chest. The apparatus includes first and second mold segments each mounted to the mouth of a steam chest. The mold segments each comprises a perforate wall defining a molding cavity which conforms to the shape of the articles being formed. The steam chest confronts the backside of the perforate walls (i.e., opposite its molding surface) and defines a steam cavity adjacent the perforate wall of its associated mold segment. In accordance with the present invention, a layer of thermal insulation is provided at the junction between the mold segment and the steam chest to reduce conductive heat transfer therebetween. By insulating the mold segments from the steam chest, less heat is conducted from the mold segment into the steam chest during steaming, and vice versa (i.e., less heat is conducted back from the steam chest back into the mold segment after it has been cooled sufficiently). In this regard once cooled and without conductive thermal feedback from the steam chest, the mold segment will remain sufficiently cool that the mold can be quickly re-closed following ejection of the previously formed article and a new molding cycle commenced sooner than would be possible without the insulation.

The benefits of the present invention are further enhanced by making the mold segments and the steam chest from aluminum, and by lining the inside surfaces of the steam chests defining the steam cavities with a layer of thermal insulation to reduce the amount of heat transferred directly into the steam chest from the steam in the steam cavity. Both contribute to keeping the steam chest cooler and hence less able to transmit heat conductivity into the mold segment. An important additional benefit derived from applicant's thermal barrier in combination with lining of the steam chests is that less condensate is formed resulting in a drier mold and higher quality drier foamed article. A still further benefit is reduction in the amount of steam and cooling water needed as well as reduced energy requirements to operate the apparatus. Finally, additional cycle time reduction may be obtained by minimizing the volume of the steam chest and locating the control valves for the various piping requirements of the apparatus as close to the steam chest as possible to minimize the time required to build up steam pressure during the steaming cycle and to build up vacuum during a vacuum cooling cycle.

BRIEF DESCRIPTION OF THE DRAWINGS

The invention will better be understood when considered in the light of the following detailed description of a specific embodiment thereof which is given hereafter in conjunction with the several figures in which.

DETAILED DESCRIPTION OF THE PREFERRED EMBODIMENT

Figure 1:
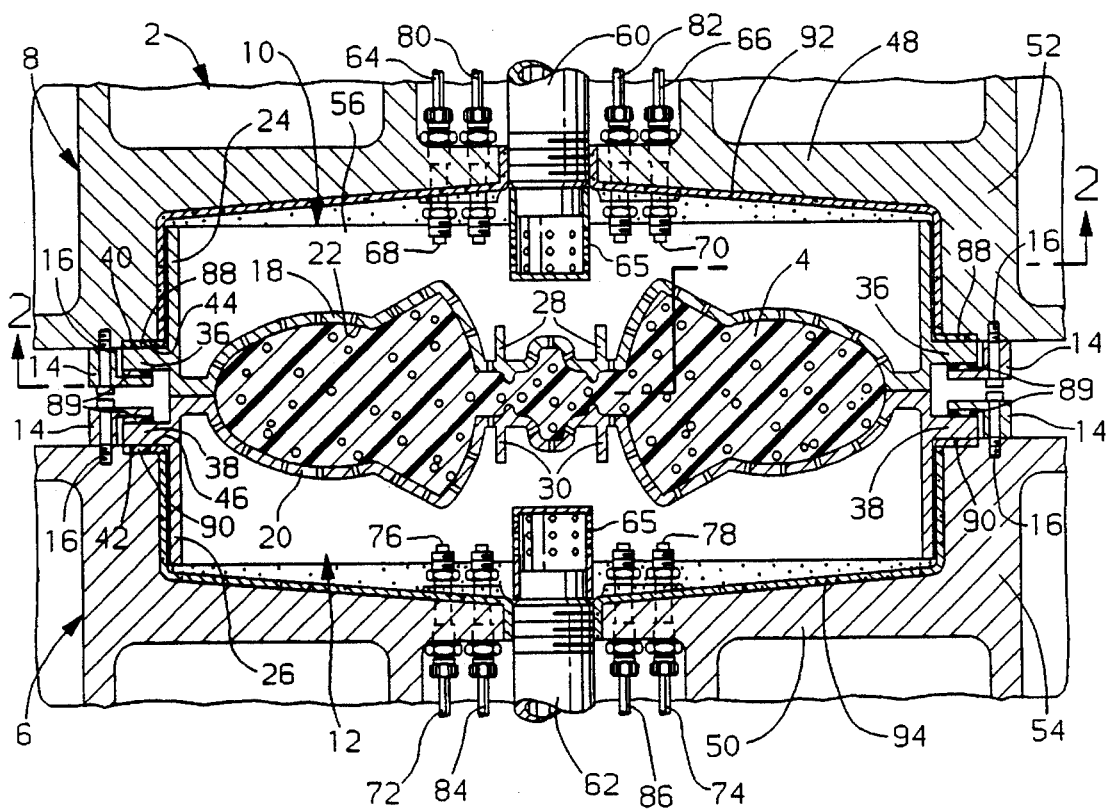
FIG. 1 is a sectioned, view of a molding apparatus in accordance with the present invention shown in the mold-closed position.
Figure 2:
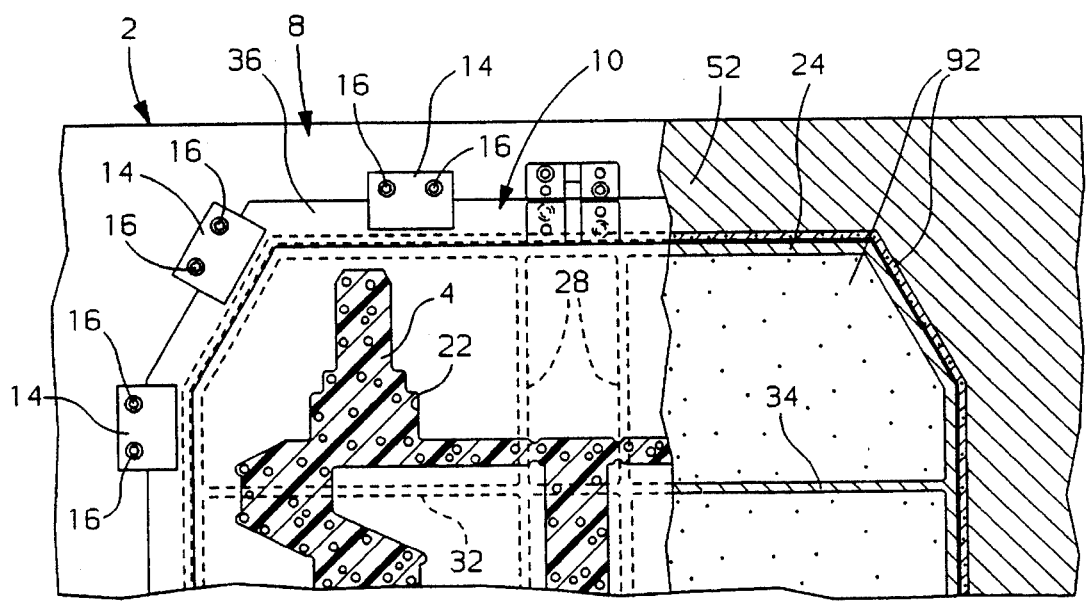
FIG. 2 is a view in the direction 2—2 of FIG. 1.
Figure 3:
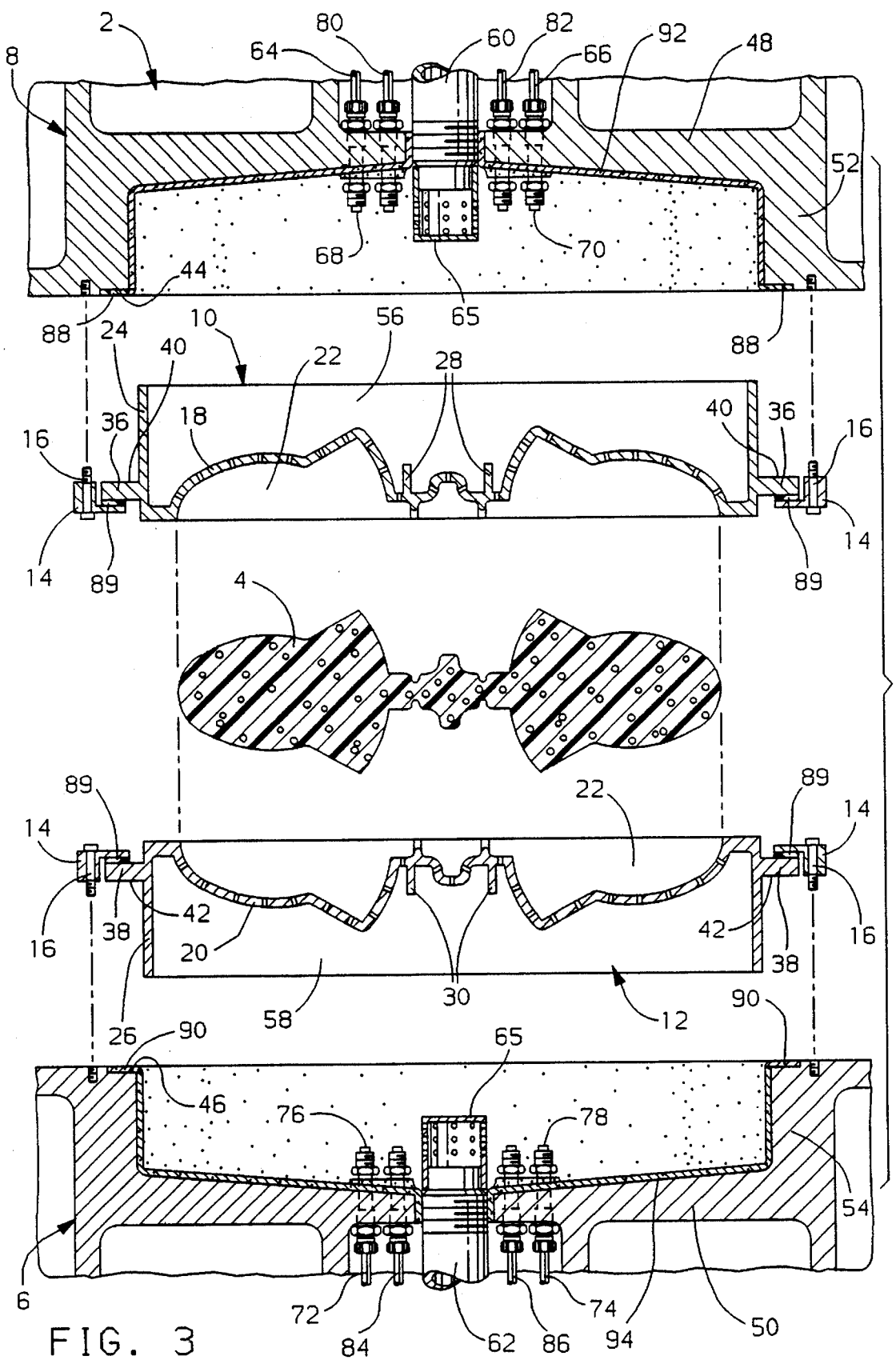
FIG. 3 is an exploded view of FIG. 1 shown in the mold-open position.

The Figures show molding apparatus 2 for steam-fusing expanded polymeric beads into a foamed article 4. The apparatus 2 includes first and second steam chests 6 and 8 having first and second mold segments 10 and 12 respectively anchored to the mouths thereof by retainer clips 14 secured by bolts 16. The mold segments 10 and 12 comprise aluminum and include perforate walls 18 and 20 respectively which, in the mold-closed position, define a molding cavity 22 into which the polymeric beads are blown in accordance with known prior art techniques. The openings in the perforate walls are smaller than the smallest beads so as to prevent escape of the beads therethrough into the steam chests. The mold segments 10 and 12 include peripheral walls 24 and 26 respectively, as well as intersecting ribs 28, 30, 32 and 34, for stiffening of the mold segments 10 and 12. Mounting flanges 36 and 38 project outwardly from the mold segments 10 and 12 respectively for anchoring the mold segments 10 and 12 to the respective mold chests 6 and 8. The mounting flanges 36 and 38 have sealing faces 40 and 42 thereon which confront mounting surfaces 44 and 46 on the steam chests 6 and 8 respectively.

The steam chests 6 and 8 each comprise a backwall 48 and 50 respectively which lies opposite the perforate walls 18 and 20 respectively. Preferably the backwalls 48 and 50 will be closely spaced from the mold inserts and conform substantially to the shape thereof to minimize the volume of the mold chest and consequently minimize steam pressure and cooling vacuum build-up time. Sidewalls 52 and 54 extend between the backwalls 48 and 50 and the mounting flanges 36 and 38 respectively, and define steam cavities 56 and 58 in the respective steam chests 6 and 8. Steam lines 60 and 62 screw into the backwalls 48 and 50 to admit steam into the steam cavities 56 and 58 respectively. Perforated baffle 65 positioned at the outlets from the steam lines 60 and 62 serve to deflect and diffuse the incoming steam throughout the steam cavities 56 and 58. Cooling water lines 64 and 66 provide water to spray nozzles 68 and 70 which spraying cooling water onto the backside of the perforate walls 18 during the cooling phase of the molding cycle as is common practice in the field. Similarly, cooling water lines 72 and 74 provide water to spray nozzles 76 and 78 for spraying cooling water onto the backside of the perforate wall 20 during the cooling cycle. Alternatively, cooling may be effected by drawing a vacuum in either or both steam chests. Air lines 80, 82, 84 and 86 enter the respective steam cavities 56 and 58 for pressurizing such cavities, after cooling, to eject the article 4 from the cavity 22 and to otherwise dry the mold cavity as much as possible prior to commencement of the next molding cycle. Dry molds produce better moldings as no water becomes entrapped in the surface of the foamed article to mar its finish.

The steam chests illustrated are each of the one-piece design—that is to say the backwall and sidewalls are one piece and the mold segments mount directly thereto. The invention, however, is not limited to such designs, but rather is applicable to other steam chest designs commonly found in the industry. Hence, for example, the invention is equally applicable to steam chest designs wherein portions (i.e., rails) of the press' platens form the sidewalls of the steam chest, a separate backplate carrying the utilities is secured to one side of the rails and a mold mounting plate is secured to the other side of the rail with an opening therein for receiving the mold segments. In this multi-piece design in addition to insulating the mold segment from the mold mounting plate according to the present invention, it is desirable to also provide insulation between the mold-mounting plate and the platen rail to further reduce conductive heat transfer therebetween. All such one-piece and multi-piece designs are considered to be "steam chests" in the context of the present invention. Moreover, the invention is likewise applicable to designs where the mold segment is mounted to a mold mounting plate and the steam chest mounted directly to the mold segment. In such a design it is desirable to also provide insulation between the mold-mounting plate and the mold segment in addition to providing insulation between the mold segment and the steam chest.

In accordance with the present invention, a layer of relatively rigid, thermal insulation 88 and 90 is positioned between the sealing faces 40 and 42 and mounting surfaces 44 and 46 respectively to prevent any substantial conduction of heat between the mold segments 18 and 20 and the steam chests 6 and 8 to which they are attached. Such insulation may comprise virtually any relatively rigid, high temperature insulating material compatible with steam. Examples of such materials include polytetrafluoroethylene gaskets having a thickness of about 0.030 inches, ceramic fiber gaskets (i.e., TRANSITE$^R$) having a thickness of about 0.25 inches, or Kaowool #822 millboard having a thickness of about ¼ inches (supplied by K-Industries Corp.). Other acceptable insulating materials include polyamide, polyimide and high durometer silicone rubbers. In addition to the insulation 88 and 90 between the mold segments 18 and 20 and the steam chests 6 and 8, the interior surfaces of the steam chests 6 and 8 defining the steam cavities 56 and 58 are lined with a thermal insulating material 92 and 94 for reducing the amount of heat transmitted directly into the walls of the steam chests 6 and 8 by the steam. Not only is such heat transmission reduced, but the lining 92 and 94 also serves to reduce the amount of condensate that would otherwise be formed in the steam cavities 56 and 58 and on the molding surface, thereby resulting in a drier molded article and drier tooling requiring less drying time before the next cycle begins. The insulating linings 92 and 94 will preferably comprise heat-cured silicone rubber cast-in-place to a thickness of about ⅜ inches. One such material comprises type "E" silicone mold-making material with matching catalyst supplied by Tool Chemical Co., Inc. So insulating the steam chests supplements the benefits of the mold-to-chest insulation of the present invention by keeping the steam chests cooler than they would otherwise be and thereby reducing their ability to conductively elevate the temperature of the mold segments. Finally, a layer of insulation 89 is provided between the retainer clips 14 and the mounting flanges 36, 38 to minimize any heat transfer therebetween, and hence back into the sidewalls 52, 54 of the steam chests 6 and 8. The insulation 89 will preferably also be formed from a low friction material such as polytetrafluoroethylene or the like to permit ready sliding of the flanges thereon as mold segment expands and contracts at different stages of the thermal cycle of the apparatus.

The mold segments 18 and 20, as well as the steam chests 6 and 8, will preferably be formed from aluminum which has a low specific heat and accordingly will heat-up and cool-down more quickly than steel while requiring less energy to effect such heating/cooling. Low specific heat materials supplement the insulation of the present invention by making it easier to remove heat from the steam chest walls, and hence reduce the possibility of its flowing into, and raising the temperature of, the mold segments.

Operationally, the apparatus of the present invention will be utilized in the same manner as other similar apparatus for molding expanded polymeric beads has been used heretofore. In this regard, the mold segments 18 and 20 are brought together in the mold-closed position shown in FIG. 1. Partially pre-expanded polymeric beads having a density of about 1.5 lbs./ft.$^3$ are then blown into the mold cavity 22 in a conventional manner so as to completely fill the cavity 22 and slightly densify the mass of beads to about 1.6 lbs./ft.$^3$. Thereafter, live steam is introduced into one of the steam cavities, e.g., 56, from whence it passes through the perforate wall 18, through the bed of beads 4 and exits the perforate wall 20 into the other steam cavity 58. Thereafter, the direction of steam flow is reversed such that the steam enters the steam cavity 58, passes through the perforate wall 20, the bead bed 4 and perforate wall 18 into the steam cavity 56. Alternatively, steam may be simultaneously introduced into both of the steam chests 6 and 8 so as to soak the beads in the steam, and thereby fuse them together according to the so-called "autoclave" technique rather than the "flow-through" steaming technique previously described. Some articles, owing to their shape and design, may require a combination of "flow-through" and "autoclave" steaming to effect uniform heating in the shortest possible time. After the beads have been steamed for a sufficient time to fuse them together, the steam is shut off and cold water sprayed from the nozzles 68,70,76 and 78 against the backsides of the perforate walls 18 and 20 to cool the molded article. Alternatively, the steam chests could be evacuated to effect cooling. Combinations of vacuum and water-spray cooling may also be used. One such combination found to be effective is to apply vacuum to one steam chest while water spraying the other. When the article has cooled sufficiently that no further expansion of the beads occurs (e.g., to about 140° F., cooling is stopped, the mold opened and compressed air introduced into the respectively steam cavities for ejecting the molded article from the mold cavity 22. The air also serves to dry the mold and ready it for the next cycle.

While the invention has been described primarily in terms of a specific embodiment thereof it is not intended to be limited thereto, but rather only to the extent set forth hereafter in the claims which follow.

The embodiments of the invention in which an exclusive property or privilege is claimed as defined as follows:

1. In apparatus for molding and steam-fusing expanded polymeric beads into a foamed article having a desired shape comprising essentially (a) first and second mold segments each having a perforate wall defining a molding cavity conforming to said shape, and (b) a steam chest joined to, and confronting the backside of, each of said mold segments opposite said molding cavity and defining a steam cavity adjacent said perforate wall, wherein the improvement comprises thermal insulation positioned between each said mold segment and its associated steam chest where said segment and chest are joined together to reduce conductive heat transfer between said segment and said steam chest.

2. Apparatus according to claim 1 wherein said steam chest comprises a metal and has an interior surface defining said steam cavity, and a layer of thermal insulation substantially completely covers said interior surface to reduce the direct heating of said steam chest during the steaming of said beads.

3. Apparatus according to claim 2 wherein said metal is aluminum.

4. Apparatus according to claim 3 wherein said mold segments comprise aluminum.

* * * * *